(12) United States Patent
Sarkar et al.

(10) Patent No.: US 10,039,040 B2
(45) Date of Patent: Jul. 31, 2018

(54) SYSTEMS AND METHODS FOR CELL CHANGE BASED ON TARGET CELL PERFORMANCE

(71) Applicant: Telefonaktiebolaget L M Ericsson (publ), Stockholm (SE)

(72) Inventors: Debasish Sarkar, Irvine, CA (US); Deepak Gupta, Haryana (IN); Ayan Sen, Gurgaon (IN); Ganesh Kumar, Coimbatore (IN)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 277 days.

(21) Appl. No.: 14/735,332

(22) Filed: Jun. 10, 2015

(65) Prior Publication Data
US 2016/0366628 A1    Dec. 15, 2016

(51) Int. Cl.
H04W 4/00      (2018.01)
H04W 36/16     (2009.01)
H04W 28/02     (2009.01)
H04W 72/04     (2009.01)
(Continued)

(52) U.S. Cl.
CPC ..... *H04W 36/165* (2013.01); *H04W 28/0284* (2013.01); *H04W 36/0083* (2013.01); *H04W 72/042* (2013.01); *H04W 36/22* (2013.01); *H04W 36/30* (2013.01)

(58) Field of Classification Search
None
See application file for complete search history.

(56) References Cited

U.S. PATENT DOCUMENTS

| 2004/0022213 A1* | 2/2004 | Choi | H04W 24/10 370/332 |
| 2005/0277416 A1* | 12/2005 | Tolli | H04W 36/0094 455/436 |

(Continued)

OTHER PUBLICATIONS

Author Unknown, "Technical Specification Group Radio Access Network; High Speed Downlink Packet Access (HSDPA); Overall description; Stage 2 (Release 12)," Technical Specification 25.308, Version 12.2.0, 3GPP Organizational Partners, Dec. 2014, 76 pages.

(Continued)

*Primary Examiner* — Mohammad Anwar
*Assistant Examiner* — Angel Brockman
(74) *Attorney, Agent, or Firm* — Withrow & Terranova, PLLC

(57) ABSTRACT

Systems and methods for a cell change based on target cell performance are disclosed. In some embodiments, a method of operation of a network node in a cellular communications network comprises receiving a measurement report from a wireless device having a serving cell, the measurement report comprising an indication that another cell is better than the serving cell such that the other cell is identified as a target cell for a cell change and the serving cell is identified as a source cell for the cell change. The method further comprises determining whether to perform the cell change from the source cell to the target cell based on one or more parameters indicative of a performance of the target cell. The method further comprises performing the cell change upon determining that the cell change from the source cell to the target cell should be performed.

25 Claims, 13 Drawing Sheets

(51) Int. Cl.
*H04W 36/00* (2009.01)
*H04W 36/30* (2009.01)
*H04W 36/22* (2009.01)

(56) References Cited

U.S. PATENT DOCUMENTS

2006/0030323 A1    2/2006   Ode et al.
2008/0130584 A1*   6/2008   Pani ................ H04W 36/0083
                                                      370/332
2014/0079020 A1    3/2014   Caverni et al.
2015/0045036 A1    2/2015   Matin et al.

OTHER PUBLICATIONS

Author Unknown, "Technical Specification Group Radio Access Network; Radio Resource Control (RRC); Protocol specification (Release 8)," Technical Specification 25.331, Version 8.10.0, 3GPP Organizational Partners, Mar. 2010, 1726 pages.

Ericsson, et al., "R1-120339: HS-DPCCH quality for MF-HSDPA transmissions," 3rd Generation Partnership Project (3GPP), TSG RAN WG1 Meeting #68, Feb. 6-10, 2012, 8 pages, Dresden, Germany.

Ericsson, et al., "R1-121767: On HS-DPCCH quality for MF-HSDPA," 3rd Generation Partnership Project (3GPP), TSG RAN WG1 Meeting #68bis, Mar. 26-30, 2012, 6 pages, Jeju, South Korea.

Huawei, "R2-095097: Event 1D+ for DC-HSUPA," 3rd Generation Partnership Project (3GPP), TSG RAN WG2 #67, Aug. 24-28, 2009, 4 pages, Shenzhen, China.

International Search Report and Written Opinion for International Patent Application No. PCT/IB2016/053336, dated Aug. 11, 2016, 15 pages.

\* cited by examiner

```
Hour: 19 Minute: 04 Second: 09 Millisecond: 252
    INTERNAL_PACKET_DEDICATED_THROUGHPUT-
SOURCE_CONF: 25      C_ID_SERV_HSDSCH_CELL: 16459
UL_THROUGHPUT:63,  DL_THROUGHPUT: 1174,
UL_USER_THROUGHPUT: 59,  DL_USER_THROUGHPUT: 1166

Hour: 19 Minute: 04 Second: 11 Millisecond: 274
    INTERNAL_PACKET_DEDICATED_THROUGHPUT-
SOURCE_CONF: 25      C_ID_SERV_HSDSCH_CELL: 16459
UL_THROUGHPUT: 34,  DL_THROUGHPUT: 1320,
UL_USER_THROUGHPUT: 20,  DL_USER_THROUGHPUT: 1296

Hour: 19 Minute: 04 Second: 13 Millisecond: 297
    INTERNAL_PACKET_DEDICATED_THROUGHPUT-
SOURCE_CONF: 25      C_ID_SERV_HSDSCH_CELL: 16459
UL_THROUGHPUT: 96,  DL_THROUGHPUT: 2201,
UL_USER_THROUGHPUT: 83,  DL_USER_THROUGHPUT: 2185

Hour: 19 Minute: 04 Second: 15 Millisecond: 727
    RRC_MEASUREMENT_REPORT (UE--->RNC)
measurementIdentity 6
    PrimaryScramblingCode 168 (16455)    cpich-Ec-N0 :16 (-16.5)
cpich-RSCP :18(-.97)
    primaryScramblingCode 304 (16459) cpich-Ec-N0:3   (-23)
cpich-RSCP: 11 (-104)
    EventResults intraFreqEventResults: { eventID
e1d       cellMeasurementEventResults fdd : {
    primaryScramblingCode 168 (16455)
```

Pre cell change throughput Serving HS CellId = 16459

RNC receives Measurement Report 1d indicating favorable condition for hsCellChange (For the given network under consideration, following values were set: hsHysteresis1d= 5db, hsTimeToTrigger1d= 640 ms, hsQualityEstimate=RSCP)

*FIG. 3A*

```
Hour: 19 Minute: 04 Second: 17 Millisecond: 340 ,
INTERNAL_PACKET_DEDICATED_THROUGHPUT -
SOURCE_CONF: 25         C_ID_SERV_HSDSCH_CELL: 16455 ,
UL_THROUGHPUT: 37 , DL_THROUGHPUT: 624 ,
UL_USER_THROUGHPUT: 25 , DL_USER_THROUGHPUT: 620

Hour: 19 Minute: 04 Second: 21 Millisecond: 384 ,
INTERNAL_PACKET_DEDICATED_THROUGHPUT-
SOURCE_CONF: 25         C_ID_SERV_HSDSCH_CELL: 16455 ,
UL_THROUGHPUT: 5 , DL_THROUGHPUT:
UL_USER_THROUGHPUT:5 , DL_USER_THROUGHPUT: 0
```

Post HS Cell change, user throughput degrades significantly in new Serving Cell (16455)

Following KPIs indicate the number of HS and EUL users in the Source and Target Cells during the period of trace collection*:

| Date | Hour | RBS Name | RNC Name | Min | Ucell Id | CID | PSC | HS USERS | EUL USERS |
|------|------|----------|----------|-----|----------|-----|-----|----------|-----------|
| 1/21/2015 | 19 | UDGPH2 | DLGGN01 | 0 | UDGPH2Z | 16459 | 304 | 29.15 | 27.32 |
| 1/21/2015 | 19 | UDGPH2 | DLGGN01 | 0 | UDGPH2Y | 16455 | 168 | 44.36 | 39.51 |

Cell 16455 has more HS & EUL users then initial HS-DSCH serving cell 16459.

*FIG. 3C*

SYSTEMS AND METHODS FOR CELL CHANGE BASED ON TARGET CELL PERFORMANCE

TECHNICAL FIELD

The present disclosure relates to a cell change procedure in a cellular communications NETWORK.

BACKGROUND

High-Speed Downlink Packet Access (HSDPA) is an enhanced Third Generation (3G) mobile telephony communications protocol in the High-Speed Packet Access (HSPA) family. HSDPA allows Universal Mobile Telecommunications System (UMTS) based networks to achieve higher downlink data speeds and capacity. As compared to UMTS, HSDPA introduces a new transport layer channel referred to as a High-Speed Downlink Shared Channel (HS-DSCH). The HS-DSCH is implemented using three new physical layer channels, namely, a High-Speed Shared Control Channel (HS-SCCH), a High-Speed Dedicated Physical Control Channel (HS-DPCCH), and a High-Speed Physical Downlink Shared Channel (HS-PDSCH). The HS-SCCH is sent two slots ahead of a corresponding data transmission to a User Equipment device (UE) on the HS-DSCH to inform the UE that data will be transmitted to the mobile terminal on the HS-DSCH two slots ahead. The HS-DPCCH carries acknowledgment information and current Channel Quality Indication (CQI) of the mobile terminal. The HS-PDSCH is the channel to which the HS-DSCH transport channel is mapped that carries actual user data.

Like all other types of networks, cellular communications networks implementing HSDPA must support mobility procedures (e.g., cell changes). The mobility procedures are based on the concept that the HS-DSCH allocation for a given UE belongs to only one of the radio cells assigned to the UE, the serving cell for the HS-DSCH or the serving HS-DSCH cell. The HS-DSCH radio link for the UE on the serving HS-DSCH cell is referred to as the serving HS-DSCH radio link. The main purpose of HSDPA mobility procedures is to handle serving HS-DSCH cell changes. When the UE moves between cells, the HSDPA connection is maintained by means of an intra-frequency serving HS-DSCH cell change between the source and target cells, both of which are in an Active Set (AS) of cells for the UE. In general, evaluation for the HS-DSCH cell change is triggered only if the parameter hsCellChangeAllowed (hsCellChangeAllowed is an overall On/Off switch for serving HS-DSCH cell change used by the Radio Network Controller (RNC) to check whether it should proceed with the cell change or not) is set to TRUE. An HS-DSCH cell change is normally triggered by event 1 d HS, that is a change of the best cell for the UE within the AS, but a serving cell change can also be triggered when the current serving cell should be removed from the AS. If Enhanced Uplink (EUL) is supported in the network, the serving cell for the EUL, which is referred to herein as the EUL serving cell, is always the same as the HS-DSCH serving cell, and the cell change is performed for both EUL and HSDPA at the same time.

The mobility procedures are based on the collection of mobility measurements from the UEs. In particular, a number of measurement handling entities for HSDPA operate to collect, control, and store the UE measurements needed for HSDPA mobility procedures and to distribute these measurements to the involved HSDPA mobility procedures, as illustrated in FIG. 1.

HSDPA defines a HS-DSCH cell change procedure whereby the RNC evaluates whether a HS-DSCH cell change should be performed for a particular mobile terminal. The HS-DSCH cell change procedure is illustrated in FIG. 2. As illustrated, a RNC 10 controlling a serving HS-DSCH cell of a UE 12 sends a measurement control message for event 1 d HS to the UE 12 (step 100). When PS Interactive (which refer to interactive class of service using R99 bearers) using either Dedicated Channel (DCH) or HSDPA is started, an extra measurement control message related only to the event 1 d HS is sent to the UE 12. This measurement control message has a measurement Identifier (ID) that is different than the measurement ID of another measurement control message dealing with the conventional event 1 d for soft handover evaluation. The reason for having a separate event 1 d HS is to be able to get UE reports triggered by only AS cells and to be able to use different hysteresis and time to trigger parameters to trigger serving HS-DSCH and EUL cell change. It is also possible to use a different quality criterion than that used for the conventional event 1 d. The default quality criteria used for the event 1 d HS is Common Pilot Channel (CPICH) Received Signal Code Power (RSCP).

The UE 12 performs measurements for the event 1 d HS (i.e., CPICH RSCP measurements on cells in the AS) (step 102). The UE 12 evaluates the measurements (step 104). In particular, when a cell in the AS becomes stronger than the current best cell+hsHysteresis1 d/2 in the AS, during a time at least equal to hsTimeToTrigger1 d, event 1 d HS occurs. The current best cell is the serving HS-DSCH cell. In response to detecting the event 1 d HS, the UE 12 sends a measurement report message for event 1 d HS to the RNC 10 (step 106)

Upon receiving the measurement report message for the event 1 d HS, the RNC 10 performs RNC evaluation to determine whether to attempt to perform a serving HSDPA/HS-DSCH cell change to the new best cell (step 108). If a triggered cell change cannot be performed, then an attempt to reconfigure the connection to DCH is normally made. This will happen for example when the UE 12 leaves an area where HSDPA is supported, or for a Drift Radio Network Controller (DRNC) cell if Iur support is not configured.

For RNC evaluation, when a HS-DSCH cell change is triggered by a change of the best cell, that is event 1 d HS, then the RNC 10 performs RNC evaluation as follows. The RNC 10 determines whether the parameter hsCellChangeAllowed is TRUE. If so, the RNC 10 performs a valid target cell evaluation within the current AS. The RNC 10 then selects the best of the AS cells that supports HS-DSCH. The selected best cell of the AS that supports HS-DSCH is HS-DSCH capable and is better than the current serving cell of the UE 12 by hsHysteresis1 d/2. If these conditions are fulfilled, then a suitable cell for the HS-DSCH cell change is found.

If a suitable cell is found, then the RNC 10 will start execution of a HS-DSCH cell change from the current serving cell (i.e., the source cell) to the best/suitable cell (i.e., the target cell). The RNC 10 first performs HS-DSCH radio link setup (step 110). In particular, a radio link reconfiguration is performed to release the HS-PDSCH resources on the HS-DSCH radio link of the source cell (i.e., the current/old serving cell) (Node B Application Part (NBAP) message from the source cell to the Serving RNC (SRNC)) and setup the HS-PDSCH resources on the HS-DSCH radio link of the new/target cell (NBAP message from the SRNC and the target cell on the same or different Node B). If the NBAP radio link reconfiguration is successful (i.e., HS-DSCH link setup is successful), a Radio Resource Control (RRC) physical channel reconfiguration is performed (steps 112-116). Finally the old HS-DSCH resources are released (step 118). At this point, execution of the HS-DSCH cell change is complete. Step 120 implies evaluation of a new Neighbor List, which has to be created after the successful HS-DSCH cell change procedure. The same is then communicated to the UE 12 via a RRC Measurement Control Message (step 122).

Notably, while not illustrated in FIG. 2, if the HS-DSCH cell change cannot be completed, then the RNC 10 will attempt to reconfigure to DCH instead. The HS-DSCH cell change can fail if the parameter hsCellChangeAllowed is FALSE, if no suitable cell for the HS-DSCH cell change is found, or if the cell change execution fails and the connection does not drop. Cell change can fail due to cell change for the EUL being blocked by admission control (if the connection is using a 2 millisecond (ms) Transmission Time Interval (TTI), the connection is reconfigured to a 10 ms TTI EUL and the cell change is re-attempted). The RNC 10 checks the parameter hsToDchTrigger and, if the transition to DCH is allowed, continues with the reconfiguration to DCH. Otherwise, the RNC 10 takes no more actions. If the transition to DCH is blocked by admission control or fails, then the RNC 10 takes no more actions.

The inventors have found that the conventional HS-DSCH cell change procedure described is less than ideal in that, under certain scenarios, the user experience after the cell change may be poor. As such, there is a need for systems and methods for improved HS-DSCH cell change.

SUMMARY

Systems and methods for cell change based on target cell performance are disclosed. In some embodiments, a method of operation of a network node in a cellular communications network comprises receiving a measurement report from a wireless device having a serving cell, the measurement report comprising an indication that another cell is better than the serving cell such that the other cell is identified as a target cell for a cell change and the serving cell is identified as a source cell for the cell change. The method further comprises determining whether to perform the cell change from the source cell to the target cell based on at least one of an average number of active wireless devices in the target cell as compared to an average number of active wireless devices in the source cell and an average wireless device throughput in the target cell as compared to an average wireless device throughput in the source cell. The method further comprises performing the cell change from the source cell to the target cell upon determining that the cell change from the source cell to the target cell should be performed. In this manner, the performance of the target cell is taken into consideration when deciding whether to perform the cell change.

In some embodiments, the cellular communications network is a High-Speed Download Packet Access (HSDPA) network, the network node is a Radio Network Controller (RNC), and the cell change is a High-Speed Downlink Shared Channel (HS-DSCH) cell change such that determining whether to perform the cell change comprises determining whether to perform the HS-DSCH cell change from the source cell to the target cell based on at least one of an average number of active HSDPA wireless devices in the target cell as compared to an average number of active HSDPA wireless devices in the source cell and an average HSDPA wireless device throughput in the target cell as compared to an average HSDPA wireless device throughput in the source cell, and performing the cell change comprises performing the HS-DSCH cell change from the source cell to the target cell upon determining that the HS-DSCH cell change from the source cell to the target cell should be performed.

In some embodiments, determining whether to perform the HS-DSCH cell change from the source cell to the target cell comprises determining that the HS-DSCH cell change from the source cell to the target cell should be performed if both: (a) the average number of active HSDPA wireless devices in the target cell is less than or equal to a sum of the average number of active HSDPA wireless devices in the source cell plus a predefined wireless device margin and (b) the average HSDPA wireless device throughput in the target cell is less than the average HSDPA wireless device throughput in the source cell plus a predefined throughput margin.

In some embodiments, determining whether to perform the HS-DSCH cell change from the source cell to the target cell comprises determining that the HS-DSCH cell change from the source cell to the target cell should be performed if: (a) the average number of active HSDPA wireless devices in the target cell is less than or equal to a sum of the average number of active HSDPA wireless devices in the source cell plus a predefined wireless device margin, (b) the average HSDPA wireless device throughput in the target cell is less than the average HSDPA wireless device throughput in the source cell plus a predefined throughput margin, and (c) if the source cell and the target cell are controlled by different radio base stations, a congestion level of a transmission network interconnecting the different radio base stations is not congested.

In some embodiments, determining whether to execute the HS-DSCH cell change from the source cell to the target cell comprises determining that the HS-DSCH cell change from the source cell to the target cell should be performed if either: (a) the average number of active HSDPA wireless devices in the target cell is less than or equal to a sum of the average number of active HSDPA wireless devices in the source cell plus a predefined wireless device margin and (b) the average HSDPA wireless device throughput in the target cell is less than the average HSDPA wireless device throughput in the source cell plus a predefined throughput margin.

In some embodiments, determining whether to perform the HS-DSCH cell change from the source cell to the target cell comprises determining that the HS-DSCH cell change from the source cell to the target cell should be performed if either (a) the average number of active HSDPA wireless devices in the target cell is less than or equal to a sum of the average number of active HSDPA wireless devices in the source cell plus a predefined wireless device margin or (b) the average HSDPA wireless device throughput in the target cell is less than the average HSDPA wireless device throughput in the source cell plus a predefined throughput margin, and if the source cell and the target cell are controlled by different radio base stations, a congestion level of a transmission network interconnecting the different radio base stations is not congested.

In some embodiments, the method further comprises determining whether a received power at the wireless device for the serving cell is less than a predefined power threshold and performing the cell change from the source cell to the target cell upon determining that the received power at the wireless device for the serving cell is less than the predefined power threshold, wherein determining whether to perform the cell change from the source cell to the target cell comprises determining whether to perform the cell change from the source cell to the target cell upon determining that the received power at the wireless device for the serving cell is not less than the predefined power threshold.

In some embodiments, the method further comprises refraining from performing the cell change from the source cell to the target cell upon determining that the cell change from the source cell to the target cell should not be executed. In some embodiments, refraining from performing the HS-DSCH cell change from the source cell to the target cell comprises continuing operation of the source cell without performing the HS-DSCH cell change for a predetermined amount of time. In some embodiments, refraining from performing the HS-DSCH cell change from the source cell to the target cell further comprises, after expiry of the predetermined amount of time, determining whether a new measurement report indicating a new cell that is better than the serving cell has been received.

In some embodiments, the method further comprises determining whether to perform a HS-DSCH cell change from the source cell to the new cell, as a new target cell, upon determining that a new measurement report indicating the new cell that is better than the serving cell has been received.

Embodiments of a network node are also disclosed.

Those skilled in the art will appreciate the scope of the present disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

FIGS. 3A through 3C illustrate a scenario where user perceived throughput decreases post HS-DSCH cell change using a combination of WRAN Radio Network trace and KPI calculated for the cells under consideration for the corresponding period;

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Systems and methods for improved cell change are disclosed. In particular, systems and methods are disclosed herein for improved High-Speed Downlink Shared Channel (HS-DSCH) cell change in a High-Speed Downlink Packet Access (HSDPA)/Universal Mobile Telecommunications System (UMTS) network. Note, however, that the concepts disclosed herein are not limited to HSDPA/UMTS. Rather, the concepts disclosed herein may be utilized to provide improved cell change in other types of networks such as, e.g., Long Term Evolution (LTE) networks, Code Division Multiple Access (CDMA)/Evolution-Data Optimized (EvDO) networks, and General Packet Radio Service (GPRS)/Enhanced Date rates for Global Evolution (EDGE) networks. Thus, while HSDPA/UMTS terminology is sometimes used herein, the present disclosure is not limited thereto.

Figure 1:
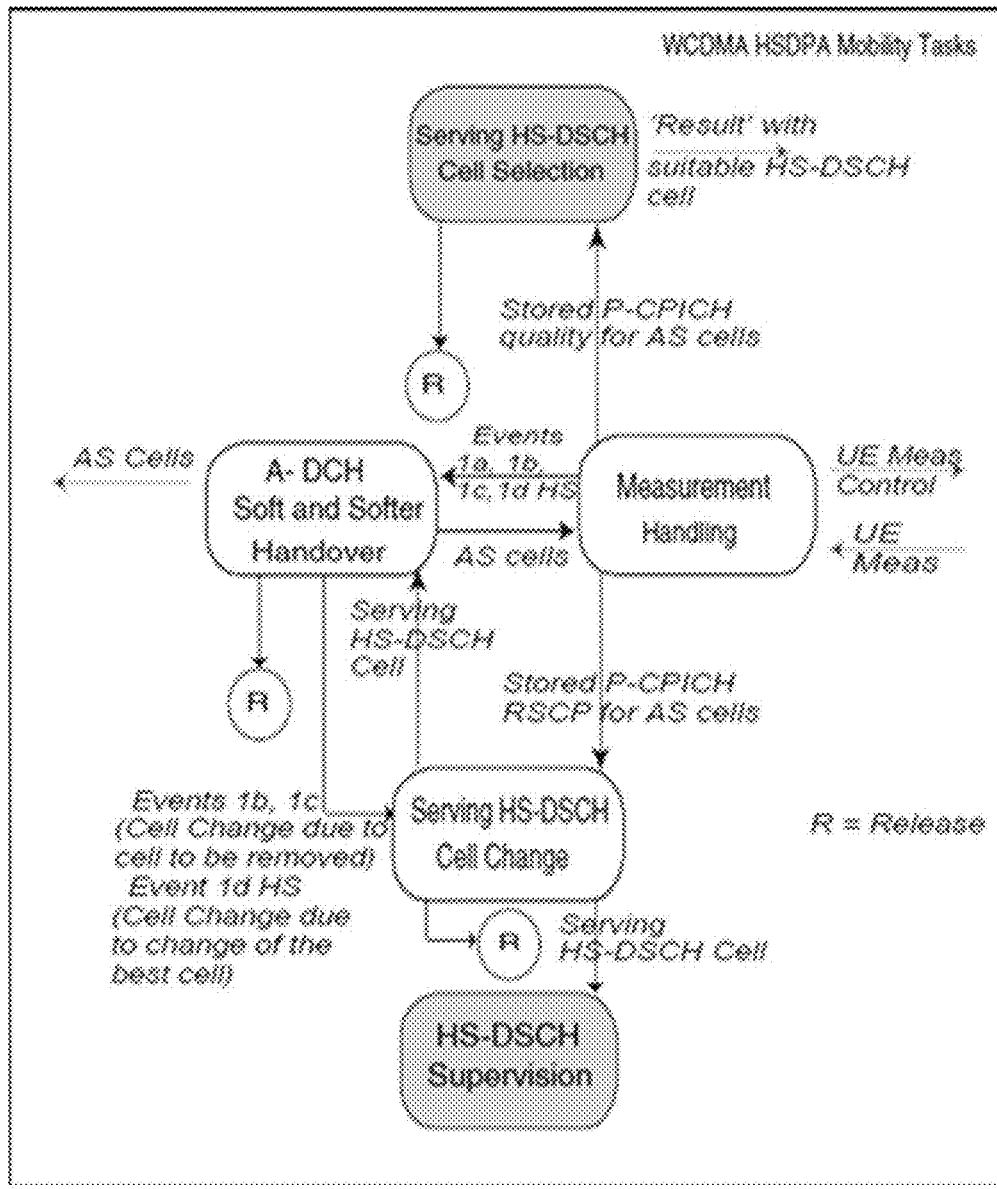
FIG. 1 illustrates a number of measurement handling entities for High-Speed Downlink Packet Access (HSDPA) mobility procedures.
Figure 2:
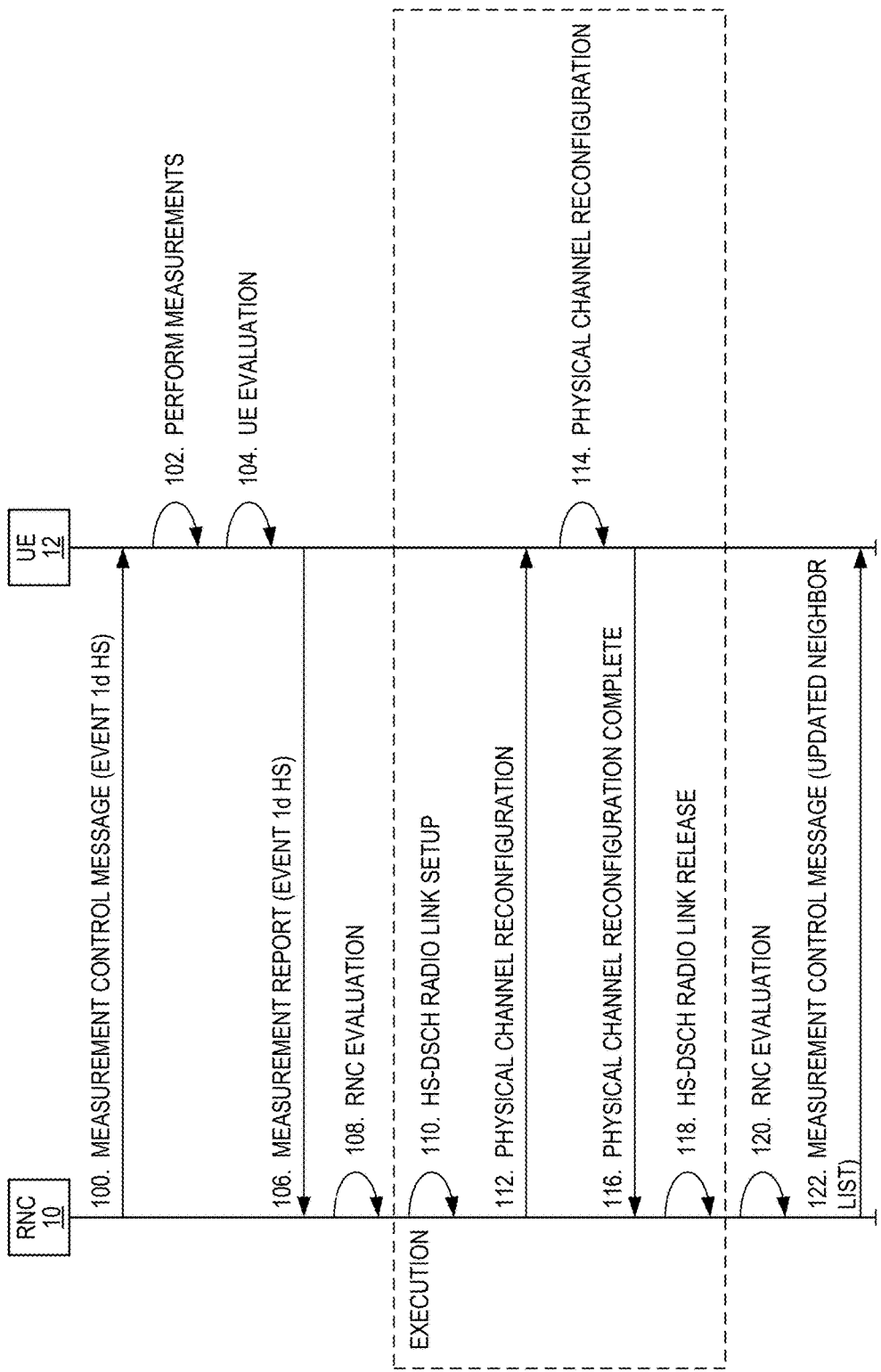
FIG. 2 illustrates a conventional High-Speed Downlink Shared Channel (HS-DSCH) cell change procedure.

Before describing embodiments of these systems and methods, a discussion of a problem with the conventional HS-DSCH cell change procedure described above with respect to FIG. 2 is beneficial. The conventional HS-DSCH cell change is performed from the source HS-DSCH cell (i.e., the current serving cell) to the target HS-DSCH cell (i.e., a new serving cell) when the target cell is stronger than the source cell plus hsHysteresis1 d/2 during a time at least equal to hsTimeToTrigger1 d. However, no consideration is given to the HSDPA user loading in the target cell or the HSDPA user throughput in the target cell. HSDPA typically works based on codes and remaining power (i.e., power left after allocation to R99 users) and the user throughput typically becomes a function of the number of simultaneous HSDPA users in a cell. Typically, during admission in the target cell, the license capacity for number of Enhanced Uplink (EUL) and HSDPA users are checked. However, this does not guarantee an equivalent performance (user throughput) in the target cell typically if the cell change happens at a relatively good coverage scenario (the target cell is stronger than the serving HS-DSCH cell by hysteresis1 d/2, but both the cells have good Received Signal Code Power (RSCP)). Under these circumstances, the user perceived throughput might decrease post HS-DSCH cell change leading to a poor user experience.

Figure 3B:
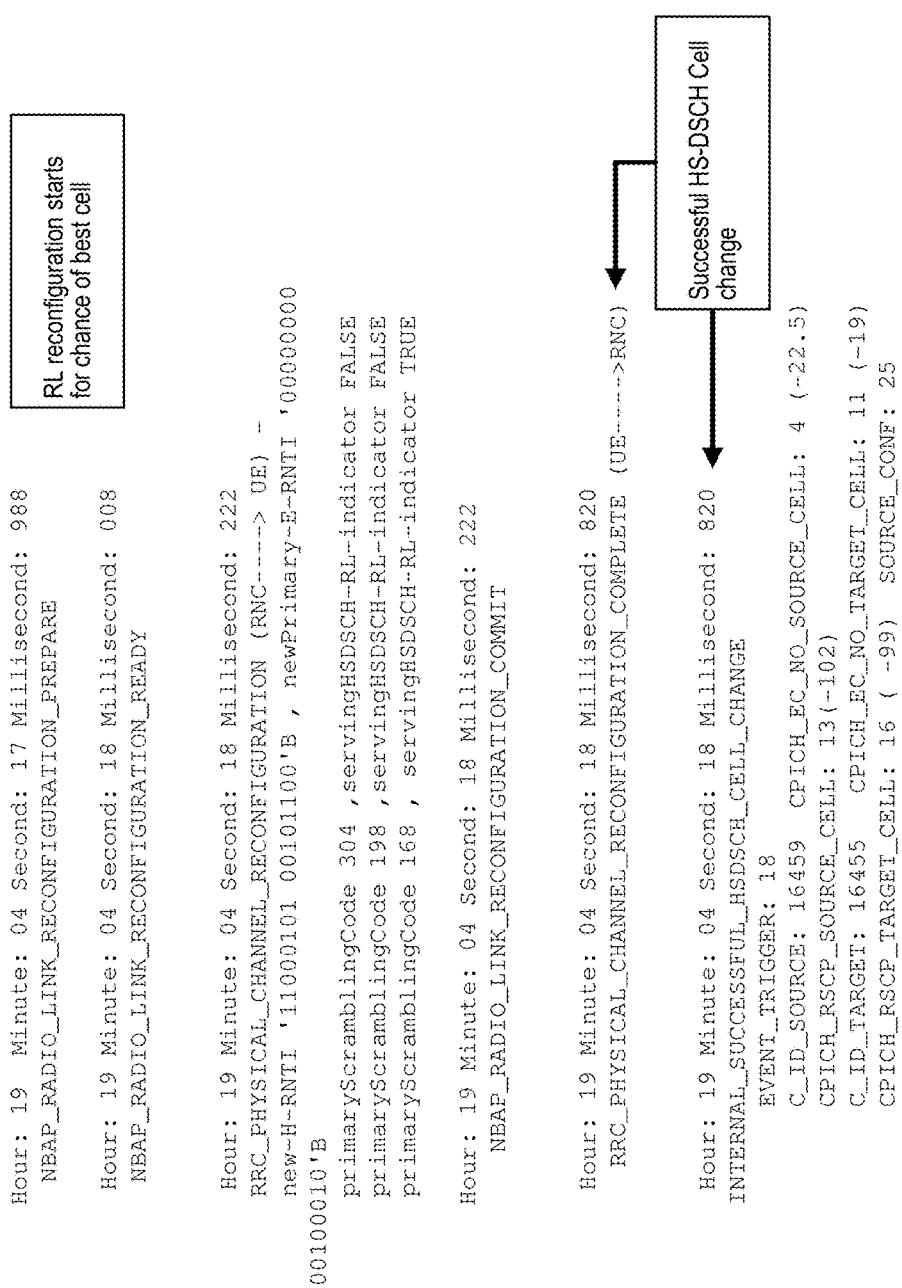

As an example, FIGS. 3A through 3C illustrate a scenario where user perceived throughput decreases post HS-DSCH cell change using a combination of WRAN Radio Network trace and KPI calculated for the cells under consideration for the corresponding period.

In order to address this problem, systems and methods for performing a more informed HS-DSCH cell change are disclosed. In particular, when evaluating whether to perform a HS-DSCH cell change, an average number of active HSDPA users (also referred to herein as an average number of HSDPA User Equipment devices (UEs) or average number of HSDPA wireless devices) in a target cell and/or an average HSDPA user throughput (also referred to herein as average HSDPA UE throughput or average HSDPA wireless device throughput) in the target cell are taken into consideration. In addition, in some embodiments, if the target cell belongs to a different Node B, Iub utilization may also be taken into consideration. In this manner, High-Speed Physical Downlink Shared Channel (HS-DPSCH) cell change may not be performed if doing so would degrade performance or user experience. In some embodiments, in order to safeguard the existing connection, a check is performed to bypass these new mechanisms in case the connection quality (signal strength) of the current serving HS-PDSCH cell is below a predetermined threshold (e.g., a threshold set by an operator of the cellular communications network).

Figure 4:
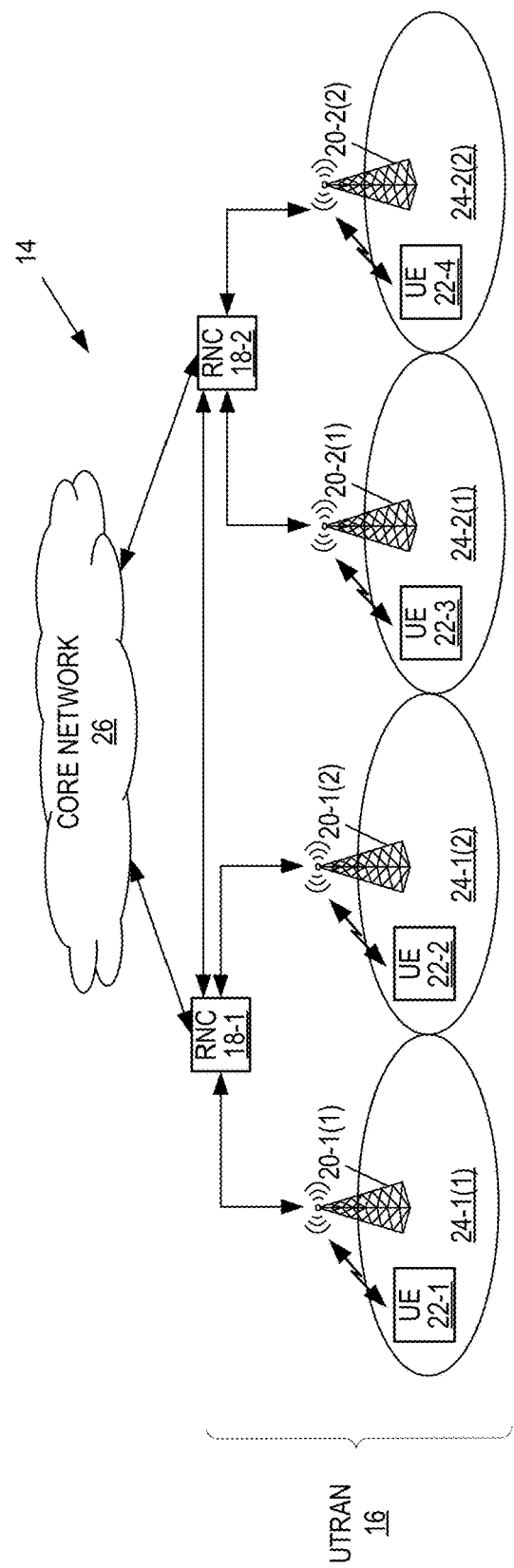
FIG. 4 illustrates one example of a Universal Mobile Telecommunications System (UMTS)/High-Speed Packet Access (HSPA) based cellular communications network according to some embodiments of the present disclosure.

Before further describing embodiments of the present disclosure, a brief description of one example of a UMTS/HSDPA based cellular communications network 14, as illustrated in FIG. 4, is beneficial. The cellular communications network 14 includes a Universal Terrestrial Radio Access Network (UTRAN) 16 including a number of Radio Network Controllers (RNCs) 18-1 and 18-2 (generally referred to herein collectively as RNCs 18 and individually as RNC 18). In this example, the RNC 18-1 controls two Node Bs 20-1(1) and 20-1(2), and the RNC 18-2 controls two Node Bs 20-2(1) and 20-2(2). The Node Bs 20-1(1), 20-1(2), 20-2(1), and 20-2(2) are generally referred to herein collectively as Node Bs 20 and individually as Node B 20. Together, a RNC 18 and its Node Bs 20 are referred to as a Radio Network Subsystem (RNS).

The Node Bs 20 provide radio access to UEs 22-1 through 22-4 (generally referred to herein as collectively as UEs 22 and individually as UE 22) in corresponding cells 24-1(1), 24-1(2), 24-2(1), and 24-2(2) (generally referred to herein collectively as cells 24 and individually as cell 24). At least some of the UEs 22 support HSDPA. These UEs 22 are also referred to herein as HSDPA UEs 22. The serving cell for a HSDPA UE 22 (i.e., the cell 24 currently serving the HSDPA UE 22) is referred to herein as a serving HS-DSCH cell of the UE 22 or a serving HS cell of the UE 22. In some embodiments, some of UEs 22 do not support HSDPA. The UEs 22 that do not support HSDPA are referred to herein as non-HSDPA UEs 22.

There are four interfaces connecting the UTRAN 16 internally or externally to other functional entities. In particular, a Iu interface is an external interface that connects the RNC 18 to a core network 26. A Uu interface is an external interface connecting the Node B 20 with the UE 22. A Iub interface is an internal interface connecting the RNC 18 with the Node B 20. A Iur interface is an internal interface most of the time, but can exceptionally be an external interface too for some network architectures. The Iur interface connects two RNCs 18 with each other.

As discussed below, the RNCs 18 provide improved serving HS-DSCH cell change by taking into consideration one or more additional criteria that are indicative of whether performance may be degraded if the HS-DSCH cell change is performed even though the target cell is stronger than the source cell plus hsHysteresis1 d/2. The one or more additional criteria include:
  the average number of active HSDPA UEs 22 in a target cell for the HS-DSCH cell change, e.g., as compared to the average number of active HSDPA UEs 22 in a source cell for the HS-DSCH cell change (i.e., the current serving HS-DSCH cell), and/or
  the average throughput of active HSDPA UEs 22 in the target cell for the HS-DSCH cell change, e.g., as compared to the average throughput of active HSDPA UEs 22 in the source cell for the HS-DSCH cell change (i.e., the current serving HS-DSCH cell).

In addition, the one or more additional criteria considered when evaluating whether to perform the HS-DSCH cell change includes, in some embodiments, a congestion level of the Iub interface between the Node B 20 of the target cell and the RNC 18 controlling the Node B 20 of the target cell (i.e., a congestion level in the transmission network interconnecting the different Node Bs 20). By taking these factors into consideration, the RNC 18 may, for example, choose not to perform the HS-DSCH cell change if performance (or user experience) would be degraded in the target cell, e.g., as compared to that in the current serving HS-DSCH cell.

Figure 5:
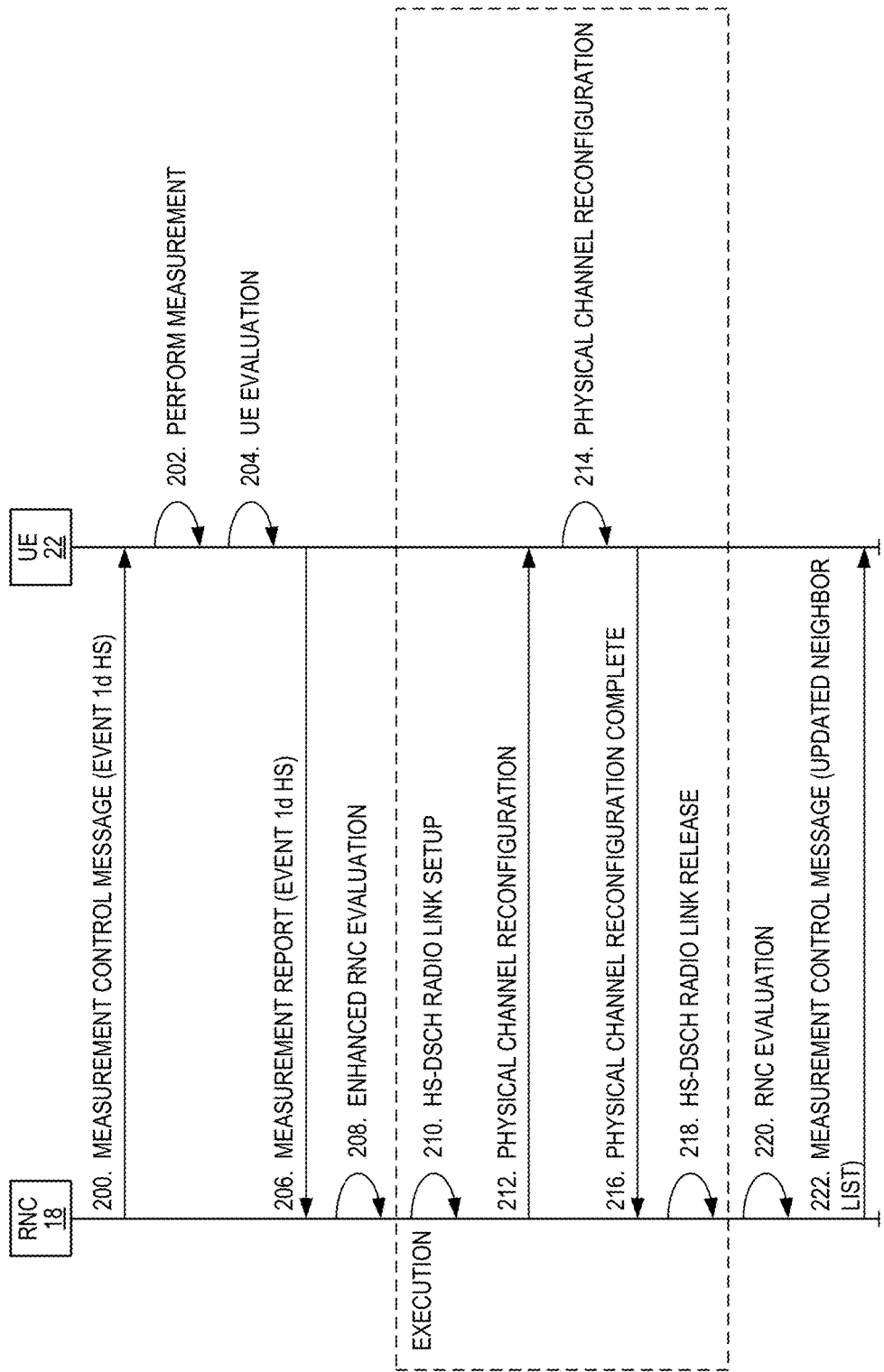
FIG. 5 illustrates a HS-DSCH cell change procedure according to some embodiments of the present disclosure.

FIG. 5 is a diagram that illustrates a HS-DSCH cell change procedure according to some embodiments of the present disclosure. As illustrated, the RNC 18 controlling a current serving HS-DSCH cell of the UE 22 sends a measurement control message for event 1 d HS to the UE 22 (step 200). The UE 22 performs measurements for the event 1 d HS (i.e., Common Pilot Channel (CPICH) RSCP measurements on cells in the Active Set (AS)) (step 202). The UE 22 evaluates the measurements (step 204). In particular, when a cell in the AS becomes stronger than the current best cell (which is the current serving HS-DSCH cell of the UE 22) plus a predetermined value (i.e., hsHysteresis1 d/2, during a time at least equal to hsTimeToTrigger1 d, event 1 d HS occurs. Notably, hsHysteresisld is a 3GPP standard parameter (see, e.g., 3GPP TS 25.331 version 8.10.0 Release 8, Section 14.1.2.4). In response to detecting the event 1 d HS, the UE 22 sends a measurement report message for event 1 d HS to the RNC 18 (step 206). Notably, the hysteresis and time to trigger values can be set separately for the event 1 d HS.

Upon receiving the measurement report message for the event 1 d HS, the RNC 18 performs an enhanced RNC evaluation procedure to determine whether to attempt to perform a serving HSDPA/HS-DSCH cell change to the new best cell (i.e., the target cell) (step 208). While the details of the enhanced RNC evaluation procedure are described below, in general, the enhanced RNC evaluation procedure takes one or more additional criteria into account when making the decision on whether to attempt to perform the HS-DSCH cell change from the current serving HS-DSCH cell (i.e., the source cell) to the target cell. In general, the one or more additional criteria are indicative of a performance of the target cell (i.e., indicative of whether performance would be degraded upon cell change to the target cell). As discussed above, the one or more additional criteria include:
  the average number of active HSDPA UEs 22 in a target cell for the HS-DSCH cell change, e.g., as compared to the average number of active HSDPA UEs 22 in a source cell for the HS-DSCH cell change (i.e., the current serving HS-DSCH cell), and/or
  the average throughput of active HSDPA UEs 22 in the target cell for the HS-DSCH cell change, e.g., as compared to the average throughput of active HSDPA UEs 22 in the source cell for the HS-DSCH cell change (i.e., the current serving HS-DSCH cell).

In addition, the one or more additional criteria considered when evaluating whether to perform the HS-DSCH cell change includes, in some embodiments, a congestion level of the Iub interface between the Node B 20 of the target cell and the RNC 18 controlling the Node B 20 of the target cell. By taking these factors into consideration, the RNC 18 may, for example, choose not to perform the HS-DSCH cell change if performance (or user experience) would be degraded in the target cell, e.g., as compared to that in the current serving HS-DSCH cell.

In this example, the RNC 18 determines that the HS-DSCH cell change is to be performed and, as such, the RNC 18 initiates a cell change execution procedure. During the cell change execution procedure, the RNC 18 first performs HS-DSCH radio link setup (step 210). In particular, a radio link reconfiguration is performed to release the HS-PDSCH resources on the HS-DSCH radio link of the source cell (i.e., the current/old serving cell) (Node B Application Part (NBAP) message from the source cell to the Serving Radio Network Controller (SRNC)) and setup the HS-PDSCH resources on the HS-DSCH radio link of the new/target cell (NBAP message from the SRNC and the target cell on the same or different Node B). If the NBAP radio link reconfiguration is successful (i.e., HS-DSCH link setup is successful), a Radio Resource Control (RRC) physical channel reconfiguration is performed (steps 212-216). Finally the old HS-PDSCH resources are released (step 218). At this point, execution of the HS-DSCH cell change is complete. Step 220 implies evaluation of new Neighbor List, which has to be created after the successful HS-DSCH cell change procedure. The same is then communicated to the UE 12 via a RRC Measurement Control Message (step 222).

If during RNC evaluation the RNC 18 determines that the cell change is not to be performed due to legacy criteria (e.g., admission control), then the RNC 18 performs legacy procedures. For instance, the RNC 18 may attempt to reconfigure the connection to the Dedicated Channel (DCH). However, at least in some embodiments, if the RNC 18 determines that the cell change is not performed due to the one or more additional criteria, the RNC 18 refrains from performing the cell change for a predetermined amount of time and then proceeds based on a new measurement report if one has been received or the old measurement report if a new measurement report has not been received.

Figure 6A:
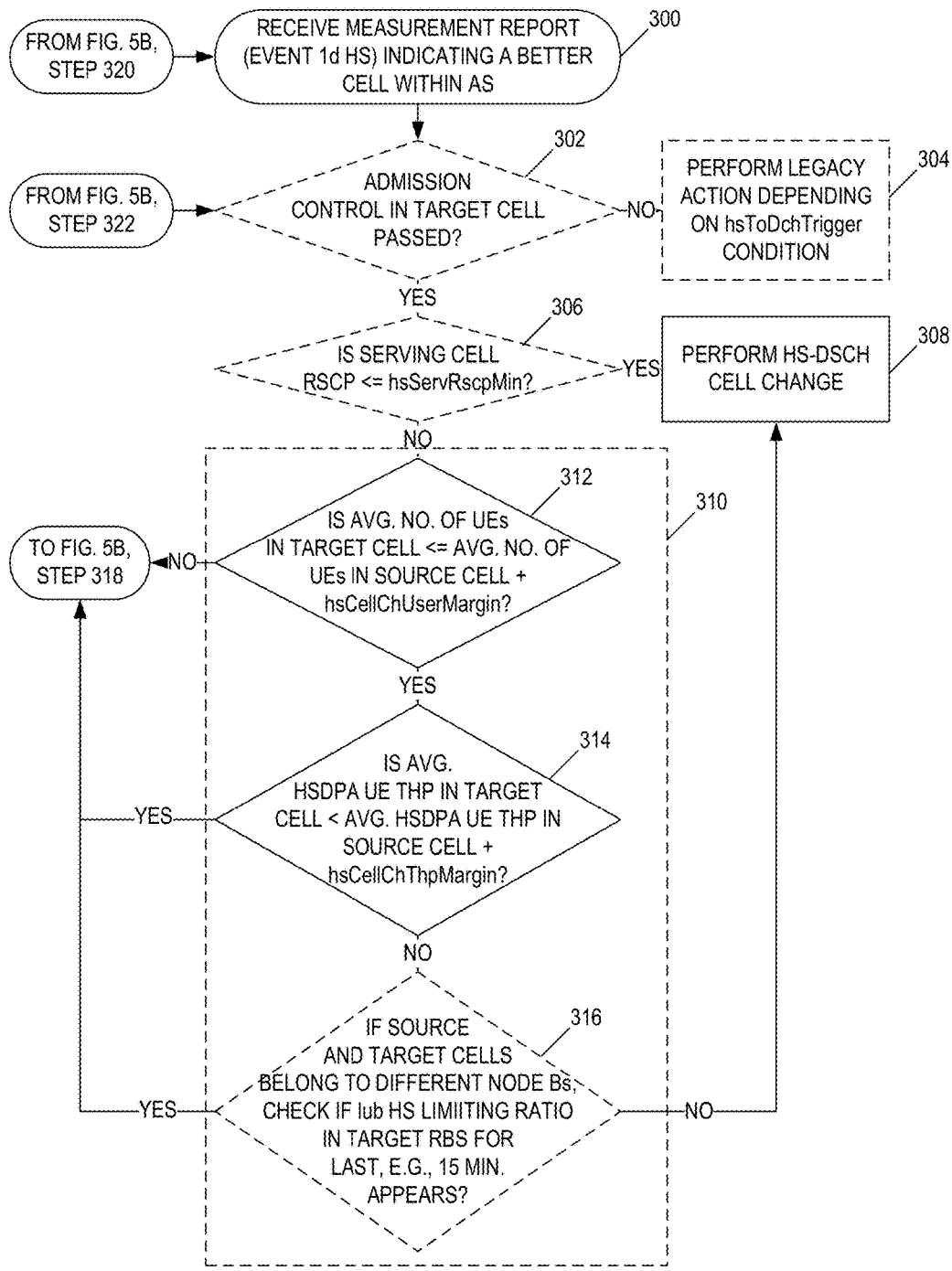
FIGS. 6A and 6B illustrate an enhanced Radio Network Controller (RNC) evaluation procedure according to some embodiments of the present disclosure.
Figure 6B:
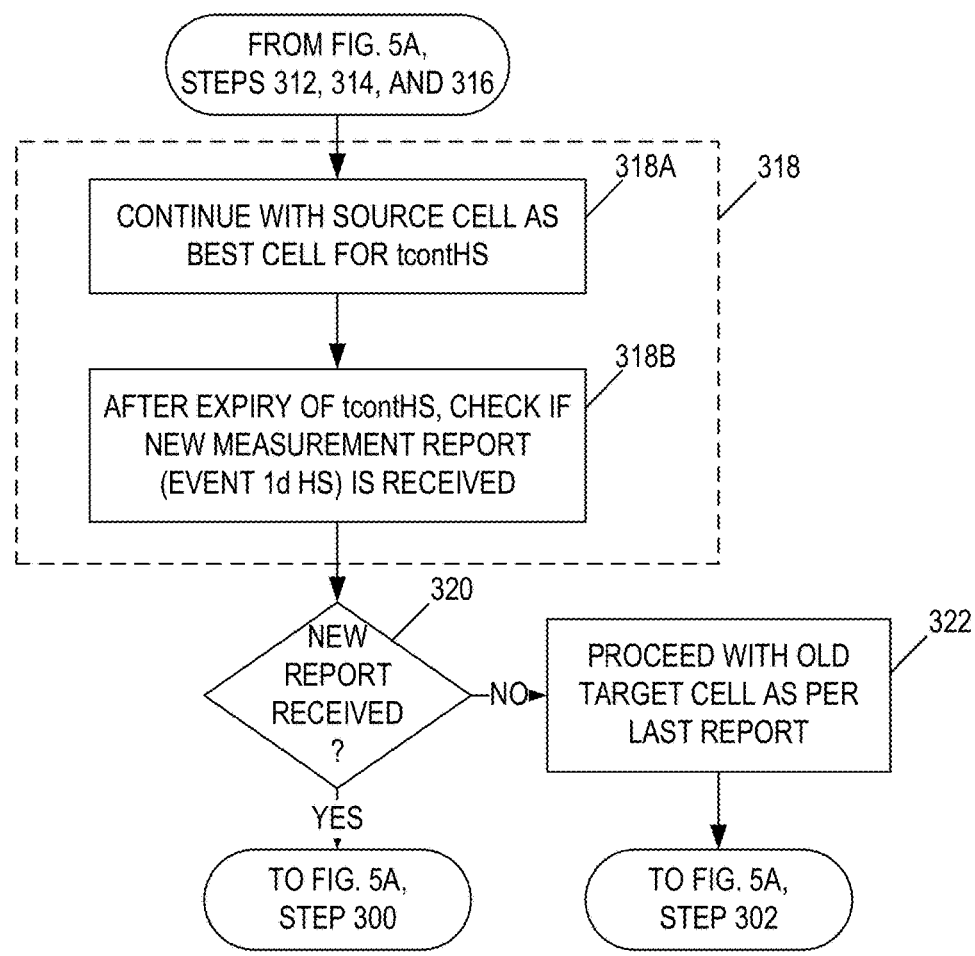

FIGS. 6A and 6B illustrate the enhanced RNC evaluation procedure of step 208 of FIG. 5 in more detail according to some embodiments of the present disclosure. Note that optional steps or steps that may not be included in all embodiments are indicated by dashed lines. As discussed above, the enhanced RNC evaluation procedure begins upon receiving a measurement report for event 1 dHS indicating a better/stronger cell in the AS than the current serving HS-DSCH cell of the UE 22 (step 300). This better cell is the target cell for the HS-DSCH cell change. In order to determine whether to perform the HS-DSCH cell change, the RNC 18 proceeds with an admission control process for the target cell. If the number of HSDPA and EUL UEs 22 in the target cell is greater than a predetermined maximum permissible limit or if the Node B 20 of the target cell has blocking, the admission control is failed. If admission control fails (step 302; NO), the RNC 18 performs legacy actions depending on, e.g., hsToDchTrigger condition (step 304). The details of these legacy actions are known to those of skill in the art and described above with respect to FIG. 2 and, therefore, are not repeated here.

If admission control is passed (step 302; YES), the RNC 18 determines whether the RSCP for the current serving HS-DSCH cell (i.e., the source cell for the HS-DSCH cell change) is less than or equal to a predetermined RSCP threshold (hsServRscMin) (step 306). The predetermined RSCP threshold may be, e.g., preconfigured by the network operator or defined by standard. Step 306 enables the RNC 18 to bypass the checks on the additional criteria in situations where the received power is lower than the threshold (i.e., a severe Radio Frequency (RF) signal degradation for the current serving HS-DSCH cell). This prevents unacceptable session quality (poor throughput) due to a delayed cell change decision. If the RSCP for the current serving HS-DSCH cell is less or equal than the predetermined RSCP threshold (step 306; YES), the RNC 18 performs the HS-DSCH cell change from the source cell to the target cell (step 308). Otherwise (step 306; NO), the RNC 18 proceeds with the evaluation of additional criteria (step 310).

In particular, in this example, the RNC 18 determines whether an average number of HSDPA UEs 22 in the target cell is less than or equal to an average number of HSDPA UEs 22 in the source cell plus a predetermined margin (hsCellChUserMargin) (step 312). The predetermined margin (hsCellChUserMargin) may, e.g., be configured by the network operator or defined by standard. The RNC 18 calculates or otherwise obtains the average number of HSDPA UEs 22 in the target cell as well as the source cell over a specified period of time (tchkHsTarget). This period of time (tchkHsTarget) may, e.g., be configurable by the network operator or defined by standard. In this example, if the average number of HSDPA UEs 22 in the target cell is not less than or equal to the average number of HSDPA UEs 22 in the source cell plus the predetermined margin (hsCellChUserMargin) (step 312; NO), then the process proceeds to step 318 where, as discussed below, cell change is delayed. Otherwise (step 312; YES), the process proceeds to step 314.

In step 314, the RNC 18 determines whether an average HSDPA UE throughput in the target cell is less than the average HSDPA UE throughput in the source cell plus a predetermined margin (hsCellChThpMargin). The predetermined margin (hsCellChThpMargin) may, e.g., be defined by the network operator or defined by standard. The RNC 18 calculates or otherwise obtains the average HSDPA UE throughput in the target cell as well as the source cell over a specified period of time (tchkHsTarget), which is, in this example, the same period of time used for the average number of HSDPA UEs 22 in the target and source cells, but is not limited thereto. In this example, if the average HSDPA UE throughput in the target cell is less than the average HSDPA UE throughput in the source cell plus the predetermined margin (hsCellChThpMargin) (step 314; YES), then the process proceeds to step 318 where, as discussed below, cell change is delayed. Otherwise (step 314; NO), the process proceeds to step 316.

In step 316, if the source and target cells are controlled, or belong to, different Node Bs 20 (which may also be referred to as radio base stations), the RNC 18 determines whether the Iub link (i.e., the interface between the Node B 20 of the target cell and the serving RNC) is congested. In this particular example, the RNC 18 determines whether the Iub of the Node B 20 of the target cell is congested by determining a percentage of time Iub congestion limits HSDPA performance in the target Node B 20 for a period of time of at least, in this example, 15 minutes. Notably, 15 minutes is just one example of the performance monitoring interval. Other amounts of time may be used. If there is congestion in the Iub of the Node B 20 of the target cell (step 316; YES), the process proceeds to step 318. Otherwise (step 316; NO), the additional criteria for HS-DSCH cell change are satisfied and, as such, the RNC 18 performs HS-DSCH cell change from the source cell to the target cell (step 308).

In this example, if any of the additional criteria are not satisfied, the RNC 18 refrains from performing the HS-DSCH cell change for a predetermined amount of time (tcontHS) (step 318). The predetermined amount of time (tcontHS) may, e.g., be configured by the network operator or defined by standard. In this particular example, the RNC 18 refrains from performing the HS-DSCH cell change by continuing with the source cell as the best cell for the preconfigured amount of time (tcontHS) despite the event 1 d HS being triggered (step 318A). Any subsequent event 1 d HS measurement reports received during the predetermined amount of time (tcontHS) are buffered. After expiry of the predetermined amount of time (tcontHS), the RNC 18 checks whether any new event 1 d HS measurement report(s) has been received (step 318B).

If a new event 1 d HS measurement report has been received (step 320; YES), the process returns to step 300 and is repeated for the new event 1 d HS measurement report. If a new event 1 d HS measurement report has not been received (step 320; NO), the RNC 18 proceeds with the old target cell as per the last received measurement report (step 322) and the process returns to step 302 is repeated again for the old target cell.

Figure 7A:
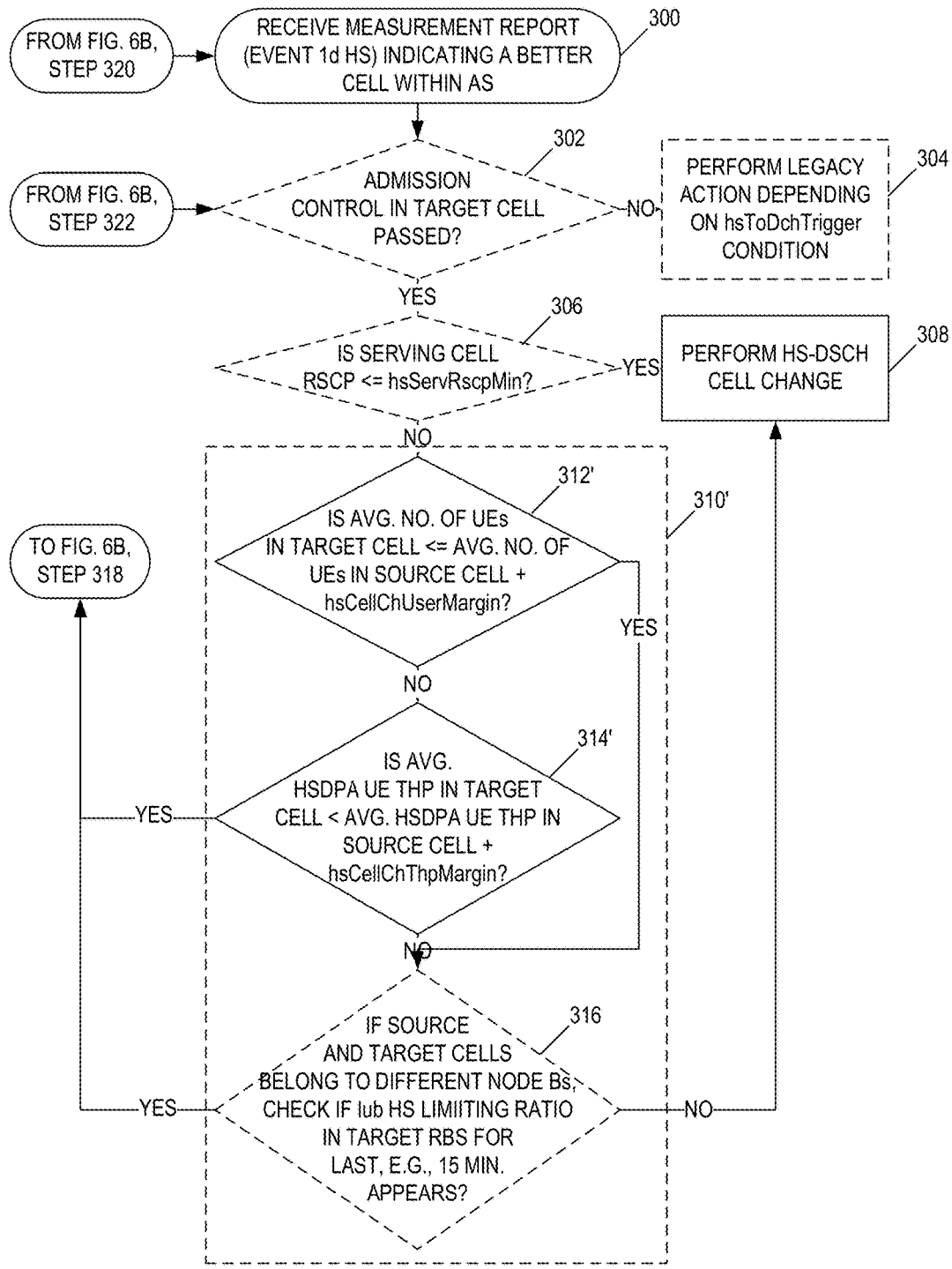
FIGS. 7A and 7B illustrate an enhanced RNC evaluation procedure according to some other embodiments of the present disclosure.
Figure 7B:
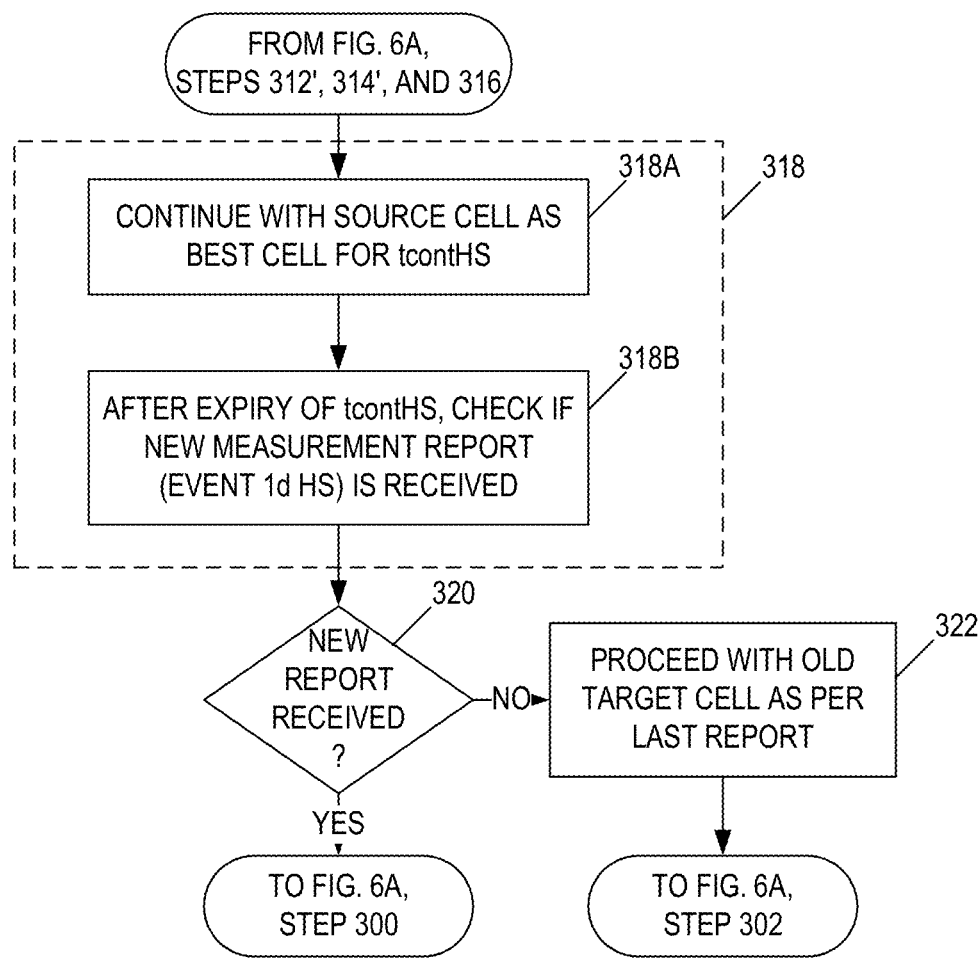

In the example of FIGS. 6A and 6B, the additional criteria are evaluated as a logical "AND" or, in other words, all of the additional criteria must be satisfied before the HS-DSCH cell change is performed. However, the present disclosure is not limited thereto. For instance, in other embodiments, at least some of the additional criteria may be evaluated as a logical "OR." As an example, FIGS. 7A and 7B illustrate a variation of the process of FIGS. 6A and 6B where the average number of HSDPA UEs 22 and the average throughput of HSDPA UEs 22 are evaluated as a logical "OR" or, in other words, the HS-DSCH cell change is performed if either of these criteria is satisfied. As illustrated, all of the steps other than step 310 are the same as that described above with respect to FIGS. 6A and 6B and, as such, the details of those steps are not repeated.

In order to evaluate the additional criteria (step 310'), in this example, the RNC 18 determines whether the average number of HSDPA UEs 22 in the target cell is less than or equal to the average number of HSDPA UEs 22 in the source cell plus the predetermined margin (hsCellChUserMargin) (step 312'). Here, if the average number of HSDPA UEs 22 in the target cell is not less than or equal to the average number of HSDPA UEs 22 in the source cell plus the predetermined margin (hsCellChUserMargin) (step 312'; NO), then the process proceeds to step 314'. Otherwise (step 312'; YES), the process proceeds to step 316.

In step 314', the RNC 18 determines whether the average HSDPA UE throughput in the target cell is less than the average HSDPA UE throughput in the source cell plus the predetermined margin (hsCellChThpMargin) (step 314'). Here, if the average HSDPA UE throughput in the target cell is less than the average HSDPA UE throughput in the source cell plus the predetermined margin (hsCellChThpMargin) (step 314'; YES), then the process proceeds to step 318 where, as discussed above, cell change is delayed. Otherwise (step 314'; NO), the process proceeds to step 316. In this manner, the process proceeds to step 316 if either of the checks in step 312' or step 314' is successful. From this point, the process proceeds as described above with respect to FIGS. 6A and 6B.

Note that while the examples of FIGS. 6A and 6B and FIGS. 7A and 7B consider both the average number of HSDPA UEs 22 and the average throughput of the HSDPA UEs 22, the present disclosure is not limited thereto. In some embodiments, only one of these two criteria is considered (i.e., either the average number of HSDPA UEs 22 or the average throughput of the HSDPA UEs 22).

Figure 8:
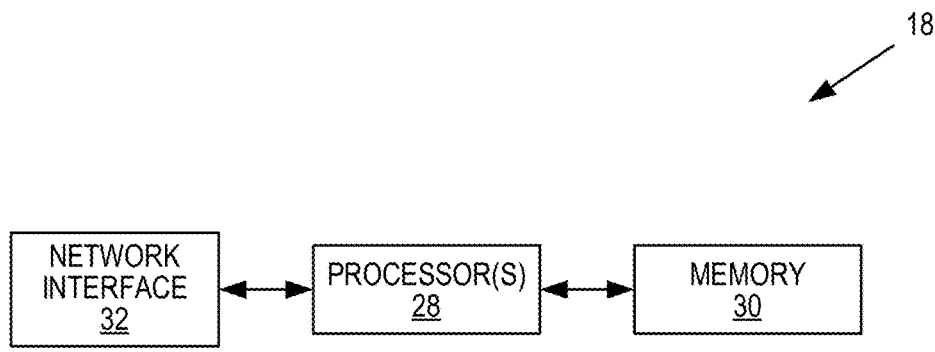
FIGS. 8 and 9 are block diagrams of an RNC according to some embodiments of the present disclosure.

FIG. 8 is a block diagram of the RNC 18 according to some embodiments of the present disclosure. As illustrated, the RNC 18 includes at least one processor 28 (also referred to as a processor circuit or processor circuitry) (e.g., microprocessor(s), Central Processing Unit(s) (CPU(s)), Application Specific Integrated Circuit(s) (ASIC(s)), Field Programmable Gate Array(s) (FPGA(s)), or the like), memory 30, and a network interface 32. In some embodiments, the functionality of the RNC 18 is implemented in software and stored in the memory 30. This software is executable by the processor(s) 28, whereby the RNC 18 operates according to any of the embodiments described herein.

In some embodiments, a computer program including instructions which, when executed by at least one processor, causes the at least one processor to carry out the functionality of the RNC 18 according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as the memory 30).

Figure 9:
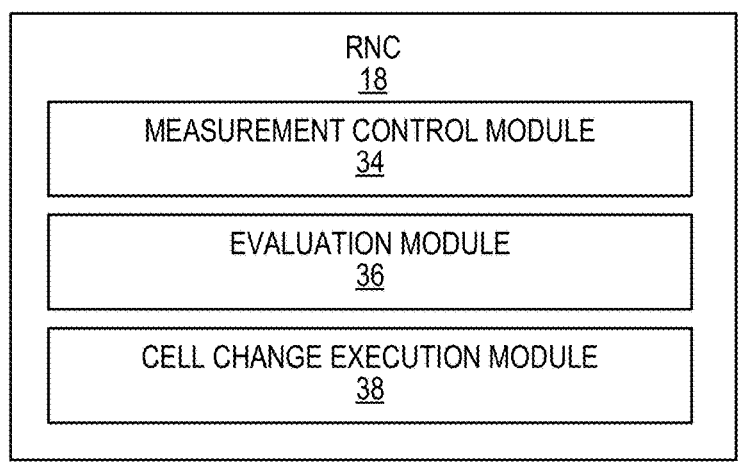

FIG. 9 is a block diagram of the RNC 18 according to other embodiments of the present disclosure. The RNC 18 includes a measurement control module 34, an evaluation module 36, and a cell change execution module 38, each of which is implemented in software. The measurement control module 34 operates to send measurement control messages to and receive measurement reports from the UEs 22 (via the associated Node B(s) 20). The evaluation module 36 operates to perform the enhanced RNC evaluation procedure described herein in order to determine whether to perform a HS-DSCH cell change in response to an event 1 d HS. The cell change execution module 38 operates to execute a HS-DSCH cell change as described herein.

Figure 10:
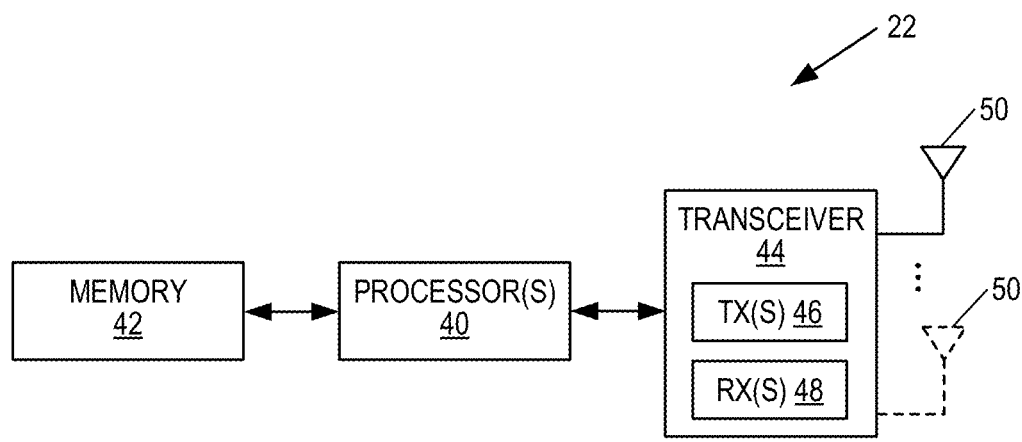
FIGS. 10 and 11 are block diagrams of a User Equipment device (UE) according to some embodiments of the present disclosure.

FIG. 10 is a block diagram of the UE 22 according to some embodiments of the present disclosure. As illustrated, the UE 22 includes at least one processor 40 (also referred to as a processor circuit or processor circuitry) (e.g., microprocessor(s), CPU(s), ASIC(s), FPGA(s), or the like), memory 42, and a transceiver 44 including one or more transmitters 46 and one or more receivers 48 coupled to at least one antenna 50. In some embodiments, the functionality of the UE 22 is implemented in software and stored in the memory 42. This software is executable by the processor(s) 40, whereby the UE 22 operates according to any of the embodiments described herein.

In some embodiments, a computer program including instructions which, when executed by at least one processor, causes the at least one processor to carry out the functionality of the UE 22 according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as the memory 42).

Figure 11:
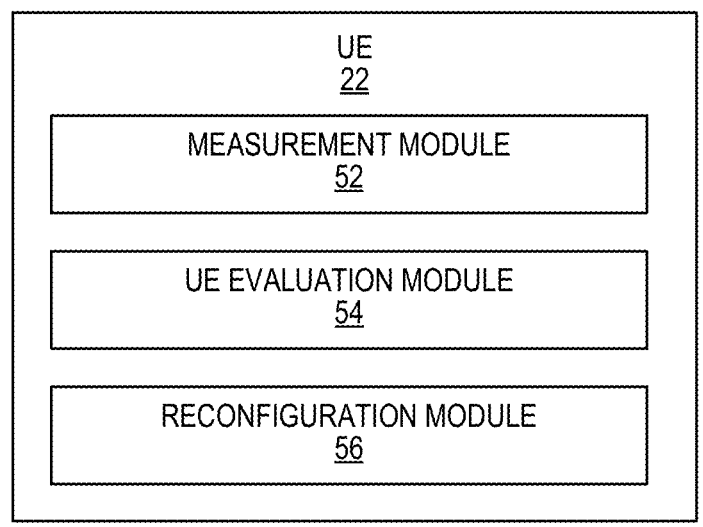

FIG. 11 is a block diagram of the UE 22 according to other embodiments of the present disclosure. As illustrated, the UE 22 includes a measurement module 52, a UE evaluation module 54, and a reconfiguration module 56, each of which is implemented in software. The measurement module 52 operates to perform measurements (e.g., RSCP measurements) on the cells 24 in the AS. The UE evaluation module 54 evaluates the measurements to determine when another cell 24 in the AS is better than the current serving cell of the UE 22 and, in response, send a measurement report indicating an event 1 d HS to the RNC 18 (via transmission of the measurement report to the Node B 20 of the current serving cell via an associated transmitter of the UE 22, which is not shown in FIG. 11). The reconfiguration module 56 operates to perform radio link reconfiguration for a HS-DSCH cell change, as described above.

The following acronyms are used throughout this disclosure.

3G Third Generation
AS Active Set
ASIC Application Specific Integrated Circuit
CDMA Code Division Multiple Access
CPICH Common Pilot Channel
CPU Central Processing Unit
CQI Channel Quality Indication DCH Dedicated Channel
DRNC Drift Radio Network Controller
DSCR Direct Signaling Connection Re-establishment
EDGE Enhanced Data Rates for Global Evolution
EUL Enhanced Uplink
EvDO Evolution-Data Optimized
FPGA Field Programmable Gate Array
GPRS General Packet Radio Service
HSDPA High-Speed Downlink Packet Access
HS-DPCCH High-Speed Dedicated Physical Control Channel
HS-DSCH High-Speed Downlink Shared Channel
HSPA High-Speed Packet Access
HS-PDSCH High-Speed Physical Downlink Shared Channel
HS-SCCH High-Speed Shared Control Channel
ID Identifier
LTE Long Term Evolution
ms Millisecond
NBAP Node B Application Part
PDP Packet Data Protocol
RF Radio Frequency
RNC Radio Network Controller
RNS Radio Network Subsystem
RRC Radio Resource Control
RSCP Received Signal Code Power
SRNC Serving Radio Network Controller
TTI Transmission Time Interval
UE User Equipment
UMTS Universal Mobile Telecommunications System
UTRAN Universal Terrestrial Radio Access Network Those skilled in the art will recognize improvements and modifications to the embodiments of the present disclosure. All such improvements and modifications are considered within the scope of the concepts disclosed herein and the claims that follow.

What is claimed is:

1. A method of operation of a network node in a cellular communications network, comprising:
    receiving a measurement report from a wireless device having a serving cell, the measurement report comprising an indication that another cell is better than the serving cell such that the other cell is identified as a target cell for a cell change and the serving cell is identified as a source cell for the cell change;
    determining whether to perform the cell change from the source cell to the target cell based on
    an average wireless device throughput in the target cell as compared to an average wireless device throughput in the source cell; and
    performing the cell change from the source cell to the target cell upon determining that the cell change from the source cell to the target cell should be performed.

2. The method of claim 1 wherein the cellular communications network is a High-Speed Download Packet Access, HSDPA, network, the network node is a radio network controller, and the cell change is a High Speed Downlink Shared Channel, HS-DSCH, cell change such that:
    determining whether to perform the cell change comprises determining whether to perform the HS-DSCH cell change from the source cell to the target cell based on at least one of:
        an average number of active HSDPA wireless devices in the target cell as compared to an average number of active HSDPA wireless devices in the source cell; and
        an average HSDPA wireless device throughput in the target cell as compared to an average HSDPA wireless device throughput in the source cell; and
    performing the cell change comprises performing the HS-DSCH cell change from the source cell to the target cell upon determining that the HS-DSCH cell change from the source cell to the target cell should be performed.

3. The method of claim 2 wherein determining whether to perform the HS-DSCH cell change from the source cell to the target cell comprises:
    determining that the HS-DSCH cell change from the source cell to the target cell should be performed if both: (a) the average number of active HSDPA wireless devices in the target cell is less than or equal to a sum of the average number of active HSDPA wireless devices in the source cell plus a predefined wireless device margin and (b) the average HSDPA wireless device throughput in the target cell is less than the average HSDPA wireless device throughput in the source cell plus a predefined throughput margin.

4. The method of claim 2 wherein determining whether to perform the HS-DSCH cell change from the source cell to the target cell comprises:
    determining that the HS-DSCH cell change from the source cell to the target cell should be performed if: (a) the average number of active HSDPA wireless devices in the target cell is less than or equal to a sum of the average number of active HSDPA wireless devices in the source cell plus a predefined wireless device margin, (b) the average HSDPA wireless device throughput in the target cell is less than the average HSDPA wireless device throughput in the source cell plus a predefined throughput margin, and (c) if the source cell and the target cell are controlled by different radio base stations, a congestion level of a transmission network interconnecting the different radio base stations is not congested.

5. The method of claim 2 wherein determining whether to execute the HS-DSCH cell change from the source cell to the target cell comprises:
    determining that the HS-DSCH cell change from the source cell to the target cell should be performed if either: (a) the average number of active HSDPA wireless devices in the target cell is less than or equal to a sum of the average number of active HSDPA wireless devices in the source cell plus a predefined wireless device margin and (b) the average HSDPA wireless device throughput in the target cell is less than the average HSDPA wireless device throughput in the source cell plus a predefined throughput margin.

6. The method of claim 2 wherein determining whether to perform the HS-DSCH cell change from the source cell to the target cell comprises:
    determining that the HS-DSCH cell change from the source cell to the target cell should be performed if:
        either (a) the average number of active HSDPA wireless devices in the target cell is less than or equal to a sum of the average number of active HSDPA wireless devices in the source cell plus a predefined wireless device margin or (b) the average HSDPA wireless device throughput in the target cell is less than the average HSDPA wireless device throughput in the source cell plus a predefined throughput margin; and if the source cell and the target cell are controlled by different radio base stations, a congestion level of a transmission network interconnecting the different radio base stations is not congested.

7. The method of claim 1 further comprising:
determining whether a received power at the wireless device for the serving cell is less than a predefined power threshold; and
performing the cell change from the source cell to the target cell upon determining that the received power at the wireless device for the serving cell is less than the predefined power threshold;
wherein determining whether to perform the cell change from the source cell to the target cell comprises determining whether to perform the cell change from the source cell to the target cell upon determining that the received power at the wireless device for the serving cell is not less than the predefined power threshold.

8. The method of claim 1 further comprising:
refraining from performing the cell change from the source cell to the target cell upon determining that the cell change from the source cell to the target cell should not be executed.

9. The method of claim 8 wherein refraining from performing the cell change from the source cell to the target cell comprises:
continuing operation in the source cell without performing the cell change for a predetermined amount of time.

10. The method of claim 9 wherein refraining from performing the cell change from the source cell to the target cell further comprises:
after expiry of the predetermined amount of time, determining whether a new measurement report indicating a new cell that is better than the serving cell has been received.

11. The method of claim 10 further comprising:
determining whether to perform a cell change from the source cell to the new cell, as a new target cell, upon determining that the new measurement report indicating the new cell that is better than the serving cell has been received.

12. The method of claim 1, wherein determining whether to perform the cell change from the source cell to the target cell further comprises determining to perform the cell change based on an average number of active wireless devices in the target cell as compared to an average number of active wireless devices in the source cell.

13. A network node for a cellular communications network, comprising:
a network interface;
at least one processor; and
memory containing instructions executable by the at least one processor whereby the network node is operative to:
receive a measurement report from a wireless device having a serving cell, the measurement report comprising an indication that another cell is better than the serving cell such that the other cell is identified as a target cell for a cell change and the serving cell is identified as a source cell for the cell change;
determine whether to perform the cell change from the source cell to the target cell based on
an average wireless device throughput in the target cell as compared to an average wireless device throughput in the source cell; and
perform the cell change from the source cell to the target cell upon determining that the cell change from the source cell to the target cell should be performed.

14. The network node of claim 13 wherein:
the cellular communications network is a High-Speed Download Packet Access, HSDPA, network;
the network node is a radio network controller;
the cell change is a High-Speed Downlink Shared Channel, HS-DSCH, cell change;
an average number of active wireless devices in the target cell is an average number of active HSDPA wireless devices in the target cell;
an average number of active wireless devices in the source cell is an average number of active HSDPA wireless devices in the source cell;
the average wireless device throughput in the target cell is an average HSDPA wireless device throughput in the target cell; and
the average wireless device throughput in the source cell is an average HSDPA wireless device throughput in the source cell.

15. The network node of claim 14 wherein, in order to determine whether to perform the HS-DSCH cell change from the source cell to the target cell, the radio network controller is further operative to:
determine that the HS-DSCH cell change from the source cell to the target cell should be performed if both: (a) the average number of active HSDPA wireless devices in the target cell is less than or equal to a sum of the average number of active HSDPA wireless devices in the source cell plus a predefined wireless device margin and (b) the average HSDPA wireless device throughput in the target cell is less than the average HSDPA wireless device throughput in the source cell plus a predefined throughput margin.

16. The network node of claim 14 wherein, in order to determine whether to perform the HS-DSCH cell change from the source cell to the target cell, the radio network controller is further operative to:
determine that the HS-DSCH cell change from the source cell to the target cell should be performed if: (a) the average number of active HSDPA wireless devices in the target cell is less than or equal to a sum of the average number of active HSDPA wireless devices in the source cell plus a predefined wireless device margin, (b) the average HSDPA wireless device throughput in the target cell is less than the average HSDPA wireless device throughput in the source cell plus a predefined throughput margin, and (c) if the source cell and the target cell are controlled by different radio base stations, a congestion level of a transmission network interconnecting the different radio base stations is not congested.

17. The network node of claim 14 wherein, in order to determine whether to perform the HS-DSCH cell change from the source cell to the target cell, the radio network controller is further operative to:
determine that the HS-DSCH cell change from the source cell to the target cell should be performed if either: (a) the average number of active HSDPA wireless devices in the target cell is less than or equal to a sum of the average number of active HSDPA wireless devices in the source cell plus a predefined wireless device margin or (b) the average HSDPA wireless device throughput in the target cell is less than the average HSDPA wireless device throughput in the source cell plus a predefined throughput margin.

18. The network node of claim 14 wherein, in order to determine whether to perform the HS-DSCH cell change from the source cell to the target cell, the radio network controller is further operative to:
- determine that the HS-DSCH cell change from the source cell to the target cell should be performed if:
  - either (a) the average number of active HSDPA wireless devices in the target cell is less than or equal to a sum of the average number of active HSDPA wireless devices in the source cell plus a predefined wireless device margin or (b) the average HSDPA wireless device throughput in the target cell is less than the average HSDPA wireless device throughput in the source cell plus a predefined throughput margin; and
  - if the source cell and the target cell are controlled by different radio base stations, a congestion level of a transmission network interconnecting the different radio base stations is not congested.

19. The network node of claim 13 wherein the network node is further operative to:
- determine whether a received power at the wireless device for the serving cell is less than a predefined power threshold;
- perform the cell change from the source cell to the target cell upon determining that the received power at the wireless device for the serving cell is less than the predefined power threshold; and
- determine whether to perform the cell change from the source cell to the target cell upon determining that the received power at the wireless device for the serving cell is not less than the predefined power threshold.

20. The network node of claim 13 wherein the network node is further operative to:
- refrain from performing the cell change from the source cell to the target cell upon determining that the cell change from the source cell to the target cell should not be executed.

21. The network node of claim 20 wherein, in order to refrain from performing the cell change from the source cell to the target cell, the network node is further operative to:
- continue operation in the source cell without performing the cell change for a predetermined amount of time.

22. The network node of claim 21 wherein, in order to refrain from performing the cell change from the source cell to the target cell, the network node is further operative to:
- after expiry of the predetermined amount of time, determine whether a new measurement report indicating a new cell that is better than the serving cell has been received.

23. The network node of claim 22 wherein the network node is further operative to:
- determine whether to perform a cell change from the source cell to the new cell, as a new target cell, upon determining that the new measurement report indicating the new cell that is better than the serving cell has been received.

24. The network node of claim 23 wherein the network node is further operative to:
- perform the cell change from the source cell to the target cell upon determining that no new measurement report has been received.

25. The network node of claim 13, wherein the network node is further operative to determine whether to perform the cell change from the source cell to the target cell based on an average number of active wireless devices in the target cell as compared to an average number of active wireless devices in the source cell.

* * * * *